United States Patent
Burns

(10) Patent No.: US 8,898,965 B1
(45) Date of Patent: Dec. 2, 2014

(54) INTEGRAL SOLAR/WIND TURBINE RAILROAD SIGNAL BUNGALOW ASSEMBLY

(71) Applicant: Railroad Signal International, LLC, Tulsa, OK (US)

(72) Inventor: Eddie Burns, Tulsa, OK (US)

(73) Assignee: Railroad Signal International, LLC, Tulsa, OK (US)

(*) Notice: Subject to any disclaimer, the term of this patent is extended or adjusted under 35 U.S.C. 154(b) by 0 days.

(21) Appl. No.: 14/187,720

(22) Filed: Feb. 24, 2014

Related U.S. Application Data

(60) Provisional application No. 61/768,211, filed on Feb. 22, 2013.

(51) Int. Cl.
 *E04H 12/20* (2006.01)
 *E04H 1/12* (2006.01)
 *B61K 13/00* (2006.01)
 *F03D 11/04* (2006.01)

(52) U.S. Cl.
 CPC .............. *E04H 1/1238* (2013.01); *B61K 13/00* (2013.01); *F03D 11/04* (2013.01)

USPC ................... 52/146; 52/147; 52/148; 52/149; 52/173.3

(58) Field of Classification Search
 USPC ......................... 52/146, 147, 148, 149, 173.3
 See application file for complete search history.

(56) References Cited

U.S. PATENT DOCUMENTS

| | | | | |
|---|---|---|---|---|
| 5,848,507 | A  * | 12/1998 | Bozich ............................ | 52/299 |
| 6,641,091 | B1 * | 11/2003 | Hilleary ..................... | 246/473.1 |
| 8,146,219 | B2 * | 4/2012 | Monostory ....................... | 29/55 |
| 8,160,832 | B2 * | 4/2012 | Luo et al. ......................... | 702/99 |
| 2007/0130834 | A1 * | 6/2007 | Kande et al. .................... | 49/139 |
| 2008/0306705 | A1 * | 12/2008 | Luo et al. ...................... | 702/134 |
| 2010/0141441 | A1 * | 6/2010 | Luo et al. ...................... | 340/540 |

* cited by examiner

*Primary Examiner* — Mark Wendell
(74) *Attorney, Agent, or Firm* — Head, Johnson & Kachigian, P.C.

(57) ABSTRACT

An integrated railroad signal bungalow assembly where a railroad signal bungalow is surrounded by an external frame, which supports a walkway structure assembly. The walkway structure assembly, in turn, supports one or more solar panels and a wind turbine. The solar panels and wind turbine supply power to equipment in the railroad signal bungalow.

12 Claims, 19 Drawing Sheets

US 8,898,965 B1

INTEGRAL SOLAR/WIND TURBINE RAILROAD SIGNAL BUNGALOW ASSEMBLY

This application claims priority to U.S. Provisional Patent Application No. 61/768,211, filed Feb. 22, 2013, which is herein incorporated by reference.

BACKGROUND OF THE INVENTION

1. Cross Reference

Not Applicable.

2. Field of the Invention

This invention relates generally to a railroad signal bungalow assembly, and more particularly, but not by way of limitation, to a railroad signal bungalow with integrated solar panels and an integrated wind turbine.

3. Description of the Related Art

Railroad signals, switches and communications equipment are frequently connected to bungalows situated near the signals and housing the signals' electrical equipment. The bungalow may house the signal's power source, surge protectors, communication equipment, switches, control equipment, and/or other electronics.

Railroad signal bungalows are typically connected to an external power supply or to batteries housed within the bungalow.

The railroad signal bungalows are frequently constructed and installed in remote locations where it is difficult and costly to transport equipment and personnel.

Based on the foregoing, it is desirable to provide a railroad signal bungalow assembly with integrated solar panels for on-site energy production.

It is further desirable to provide a railroad signal bungalow assembly with an integrated wind turbine for further on-site energy production.

It is further desirable to provide an integrated solar/wind turbine railroad signal bungalow assembly that is simple to install.

It is further desirable to provide an integrated solar/wind turbine railroad signal bungalow assembly that will withstand wind, ice, and other environmental conditions.

SUMMARY OF THE INVENTION

In general, in a first aspect, the present invention relates to a railroad signal bungalow assembly having: a railroad signal bungalow; an external frame; a walkway structure; one or more solar panels supplying power to the bungalow; and a wind turbine supplying power to the bungalow.

The external frame may surround the railroad signal bungalow, and the walkway structure may be mounted to the external frame. The external frame may have a mounting plate with a plurality of bolt holes such that the walkway structure may be mounted to the external frame via the mounting plate in any of a plurality of orientations.

The solar panels and wind turbine may be mounted to the walkway structure. The solar panels may be mounted to the walkway structure via a solar panel mounting bracket, where the solar panel mounting bracket allows the solar panels to pivot such that the solar panels may be angled as desired.

The railroad signal bungalow assembly may further comprise a ladder attached to the walkway structure such that the walkway structure may be accessed via the ladder. Likewise, the railroad signal bungalow assembly may further comprise guy wires attached to the walkway structure such that the guy wires may extend to and be secured into ground.

Figure 1:
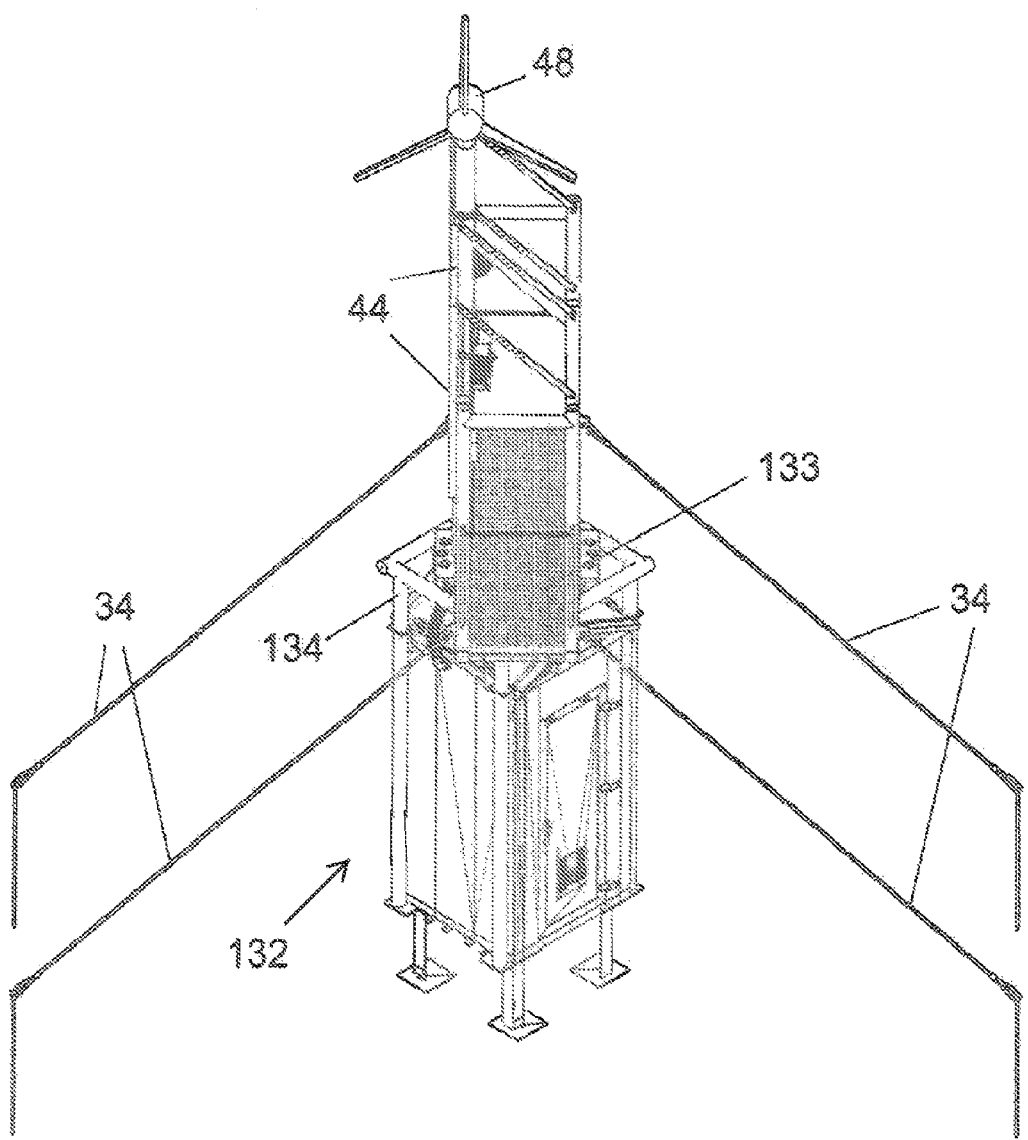
FIG. 1 is a perspective view of a railroad signal bungalow assembly constructed in accordance with the present invention.
Figure 2:
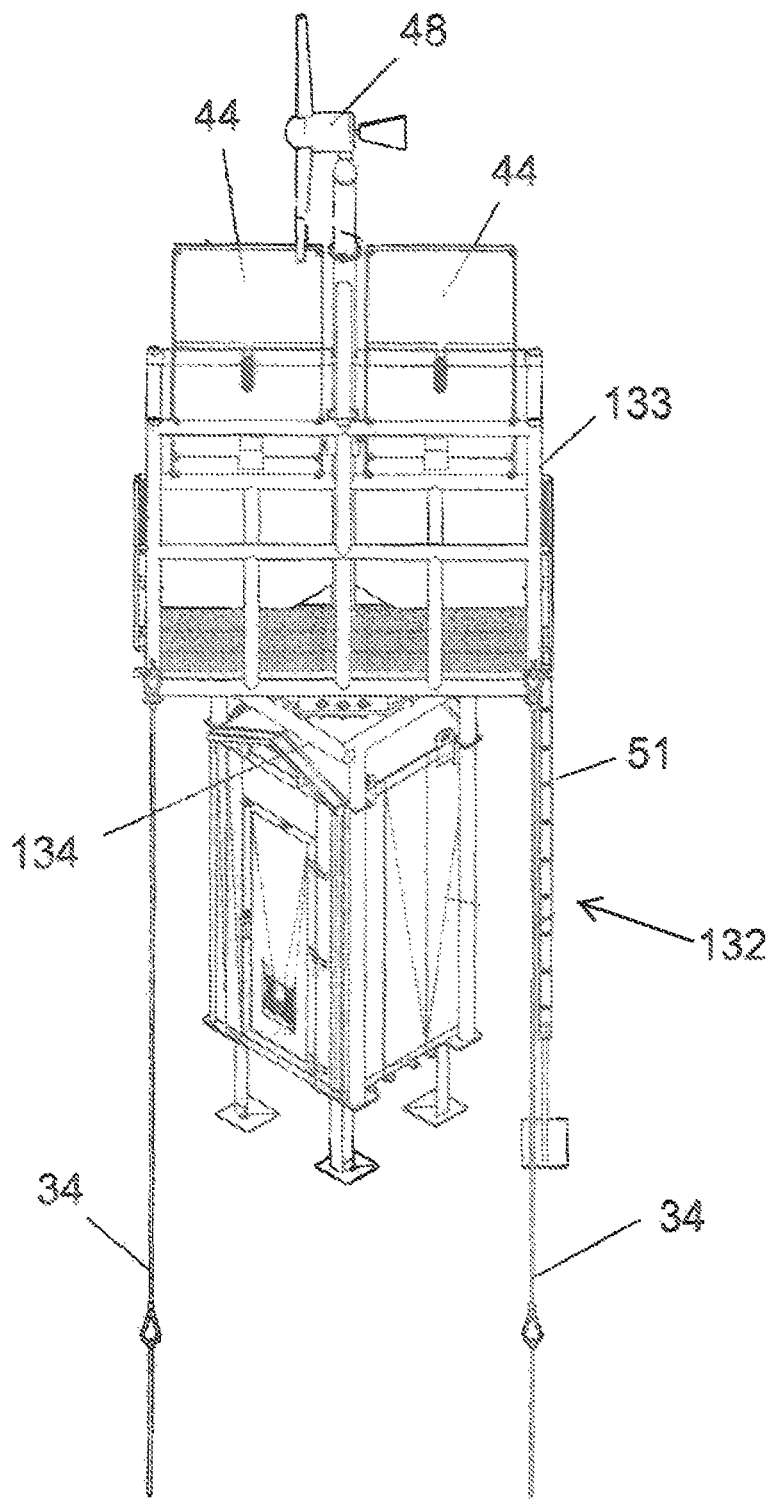
FIG. 2 is a perspective view of the railroad signal bungalow assembly, turned 90° from FIG. 1.
Figure 3:
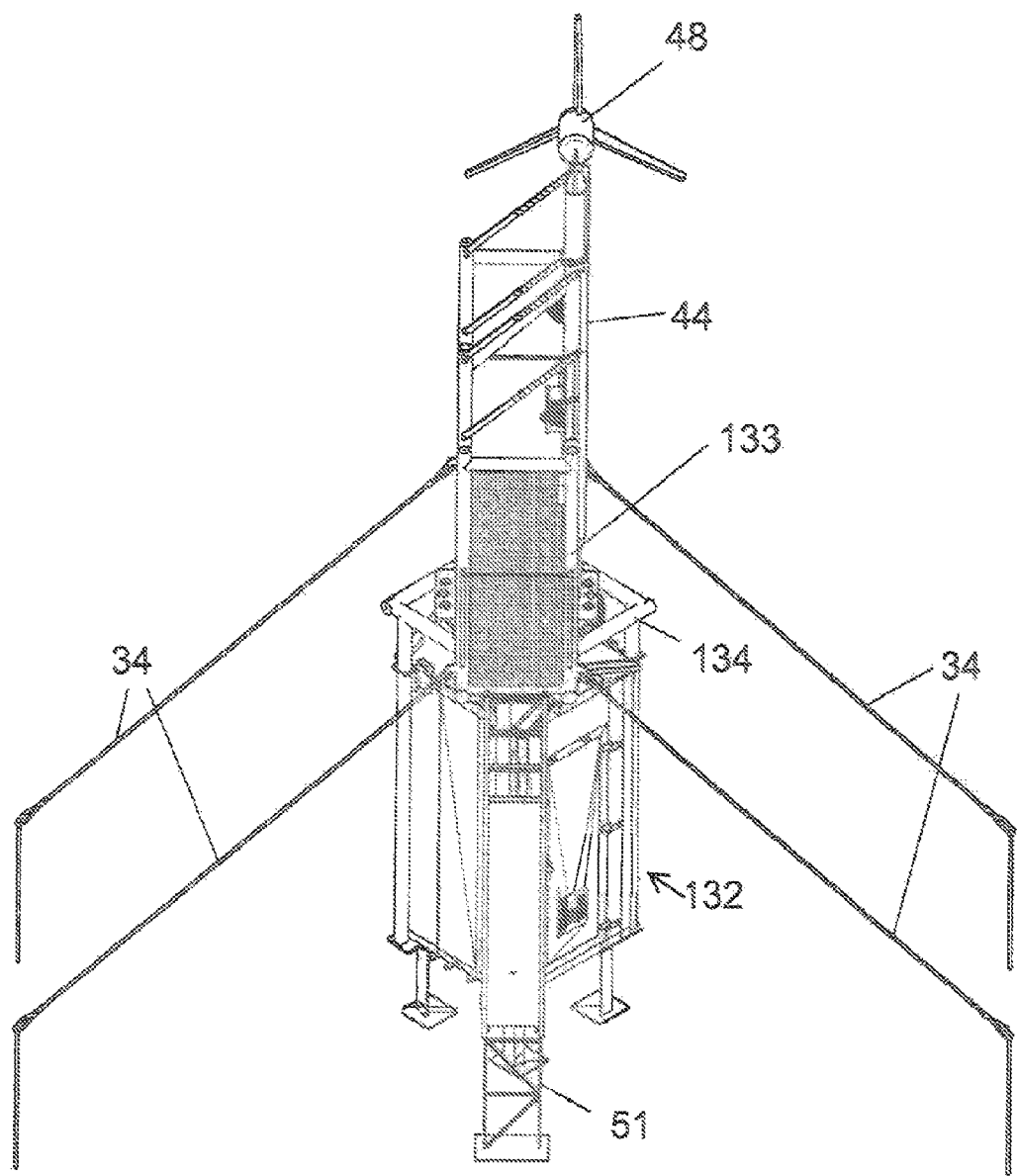
FIG. 3 is a perspective view of the railroad signal bungalow assembly, turned 90° from FIG. 2.
Figure 4:
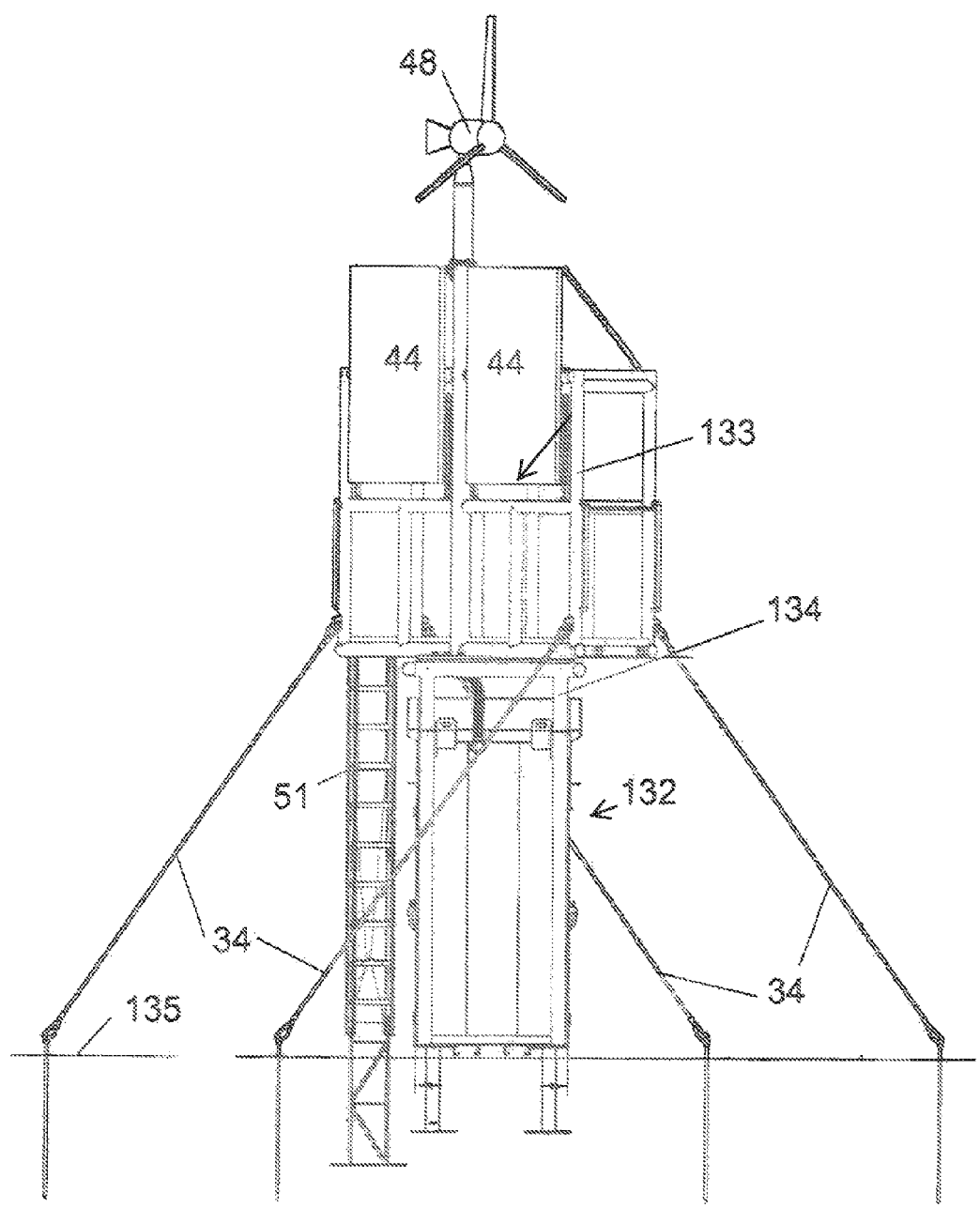
FIG. 4 is a side view of the railroad signal bungalow assembly.
Figure 5:
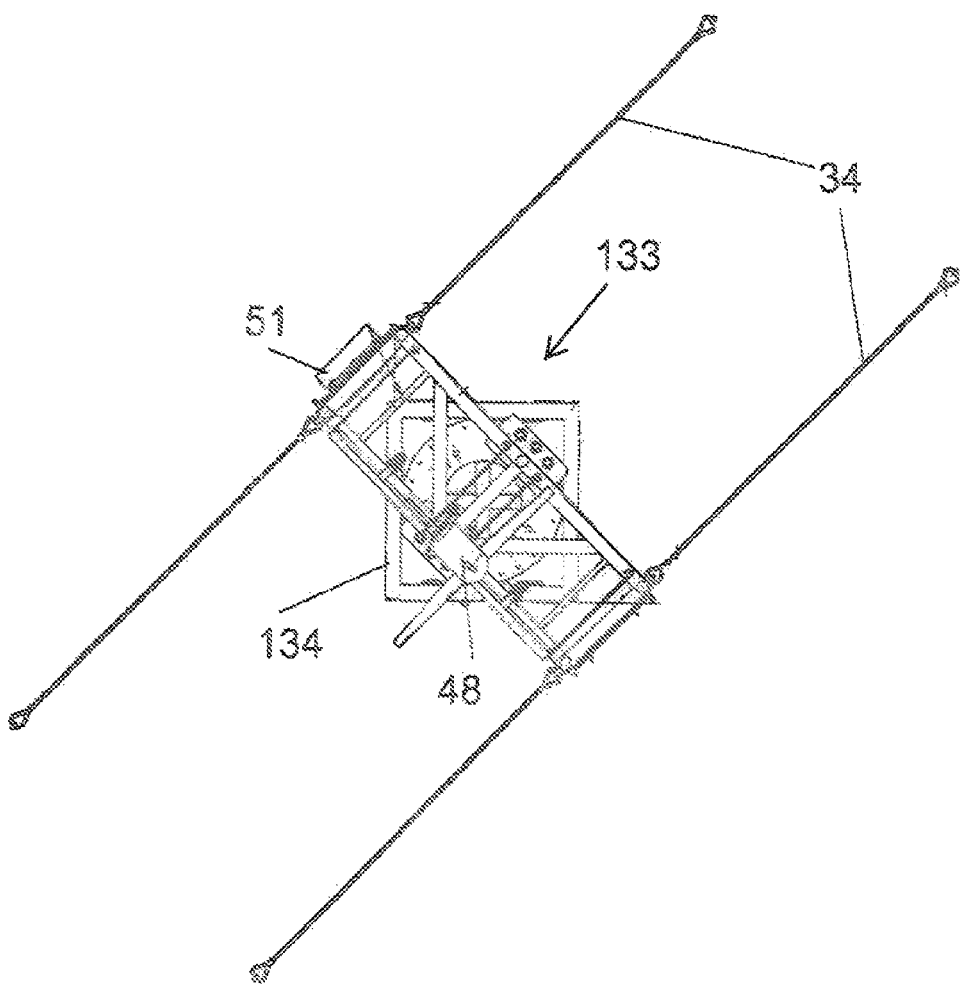
FIG. 5 is a top view of the railroad signal bungalow assembly.

Other advantages and features will be apparent from the following description and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

The present invention relates to a railway signal bungalow assembly 132 with a plurality of solar panels 44 and a wind turbine 48 integrated therewith. The solar panels 44 and wind turbine 48 may provide a source of electrical energy for railway signals, switches and communication equipment rendering the bungalow assembly 132 a stand-alone unit as will be described herein. Both the solar panels and wind turbine may generate electrical energy which is delivered to batteries (not shown) inside of the bungalow.

The railroad signal bungalow assembly 132 is comprised of modular components that are easily assembled in the field on site in a desired configuration.

The railway signal bungalow assembly 132 having solar panels 44 and wind turbine 48, as fully assembled, is shown from various angles in FIGS. 1 through 5. The solar panels 44 and wind turbine 48 may be mounted to a walkway structure 133, which in turn may be mounted to an external frame 134 surrounding, attached to and supporting the bungalow assembly 132. The walkway structure 133 may be capable of being attached to the external frame 134 in a plurality of positions, allowing the walkway structure 133 and attached solar panels 44 to be oriented as desired. For example, FIGS. 1 through 5 show the walkway structure 133 rotated 45 degrees relative to the bungalow 132. The walkway structure 133 may have a ladder 51 attached thereto, providing access from the ground to the walkway structure 133. The ladder 51 may be located on either end of the walkway structure 133.

Guy wires 34 may be attached to the walkway structure 133 and extend to be secured in the ground 135 for added support. The guy wires 34 may be at a 45 degree angle and may be anchored 48" into the ground 135, or any appropriate angle and depth.

The walkway structure 133 may retain and support the solar panels 44 and the wind turbine 48, and may also serve as a walkway for maintenance, adjustment, and cleaning of the solar panels 44.

Figure 6:
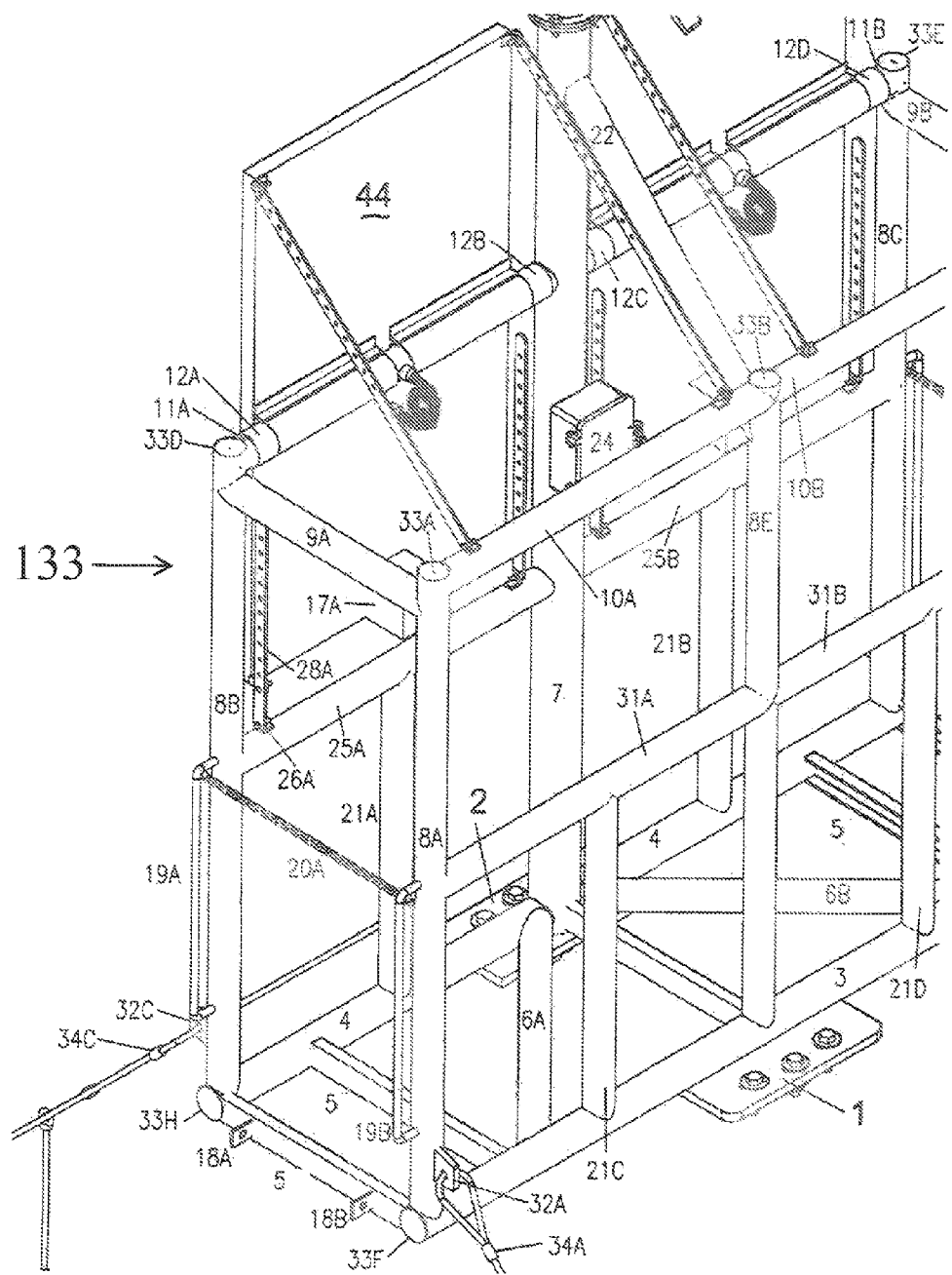
FIG. 6 is a close-up view of the one end of the walkway.
Figure 7:
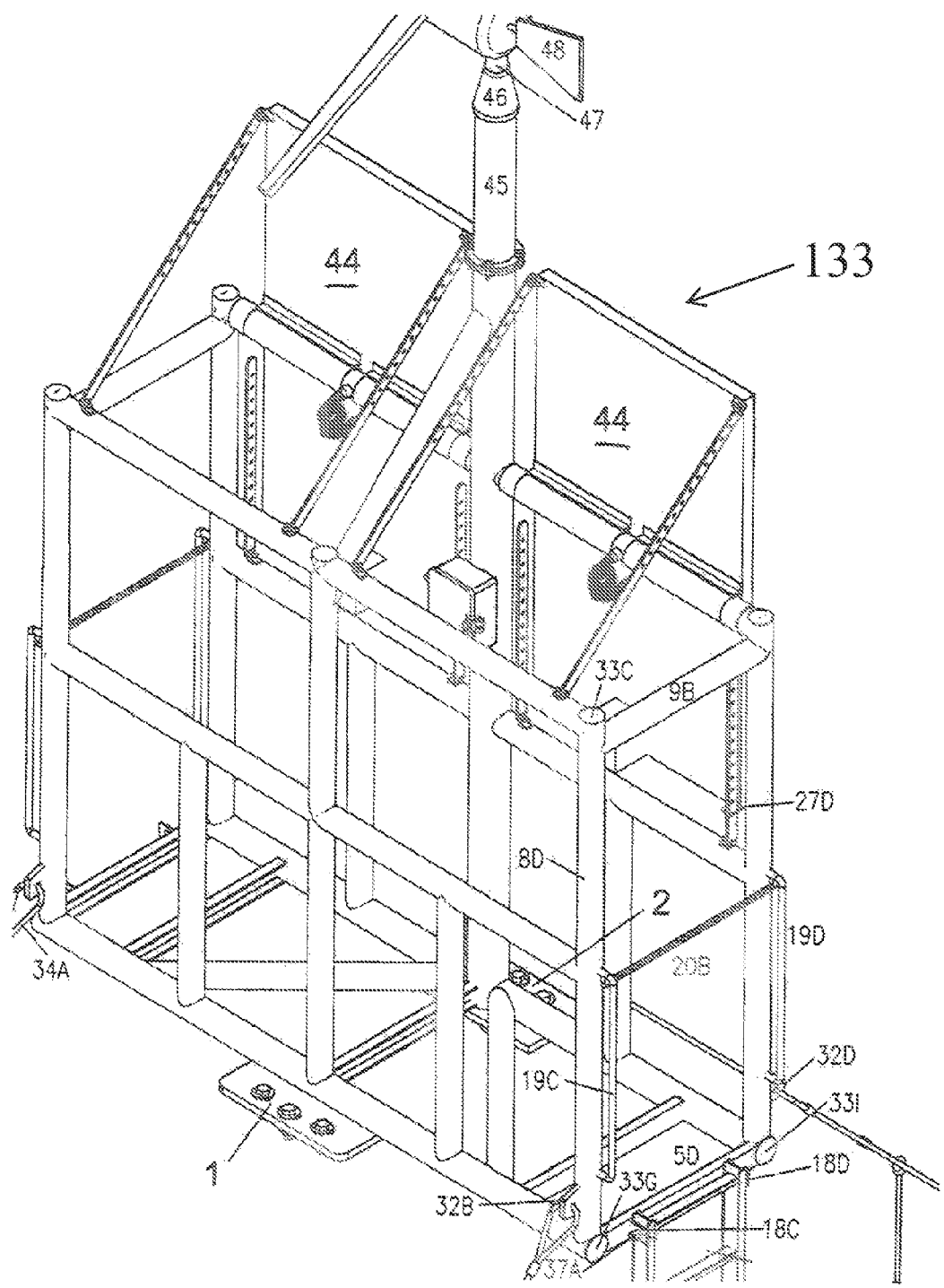
FIG. 7 is a close-up view of the walkway.

FIGS. 6 and 7 show the walkway structure 133 apart from the assembly. As seen in FIGS. 6 and 7, the walkway structure 133 may be composed of tubes or pipes, including a front support pipe 3, back support pipes 4, c-channel under walkways 5, diagonal support pipes 6, a lower wind mast 7, tall vertical support pipes 8, horizontal end support pipes 9, a top front horizontal support pipe 10, top back horizontal support pipes 11, stop pipes 12, short vertical support pipes 21, a diagonal support plate 22 above the walkway structure 133, middle back horizontal support pipes 25, middle front horizontal support pipes 31, and a plurality of end caps 33 for the various support pipes. The walkway structure 133 includes mounting plates 1 and 2 at the bottom thereof.

The walkway structure 133 may have hand rails 19 and a safety chain 20 at each end, as well as a ladder mounting bracket 18. A bracket 18 may be provided at each end so that a ladder can be attached on whichever end is convenient. The guy wires 34 may be attached to the walkway structure 133 via guy wire mounting brackets 32.

The walkway structure 133 may have mounted therein a junction box 24 which will connect wiring from the solar panels to the batteries. The wind turbine 48 may be mounted to the lower wind mast 7 via an upper wind mast 45, a reducer 46, and a wind turbine mounting pipe 47, as seen in FIG. 7. The walkway structure 133 may also be equipped with a GPS mounting bracket and removable masts for optional radio antennas.

Figure 8:
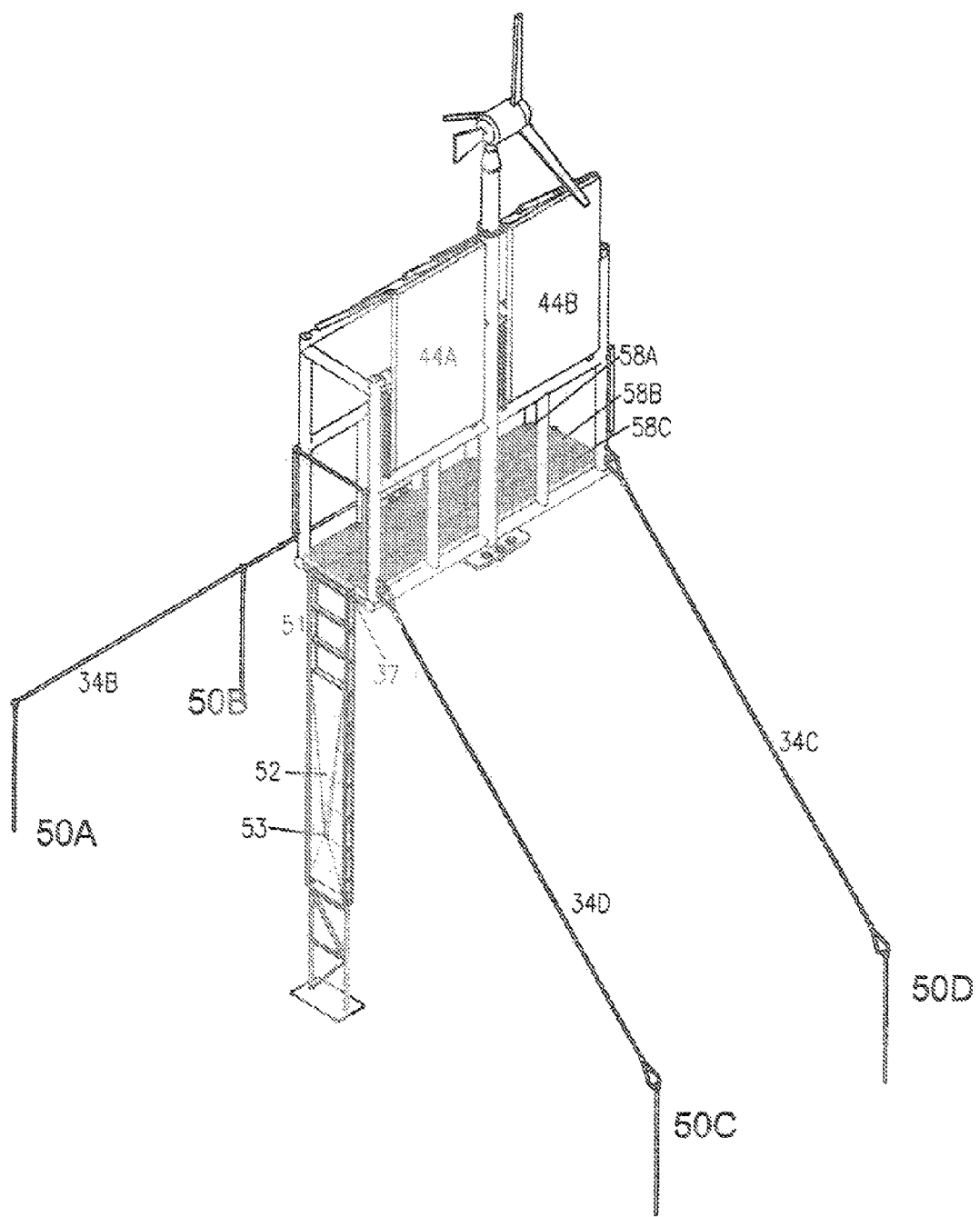
FIG. 8 is a perspective view of the walkway.

FIG. 8 is a perspective view of the walkway structure 133 apart from the assembly. The ladder 51 may be attached to either end of the walkway structure 133 and held in place with fasteners, such as a pair of cotter pins 37. The ladder 51 may have a ladder guard 52 and a ladder locking bracket 53. The bottom of the walkway structure 133 may be covered in one or more walkway mats 58 to provide a flat surface on which a user may stand. The guy wires 34 may be anchored in the ground 135 by guy wire spikes 50.

Figure 9:
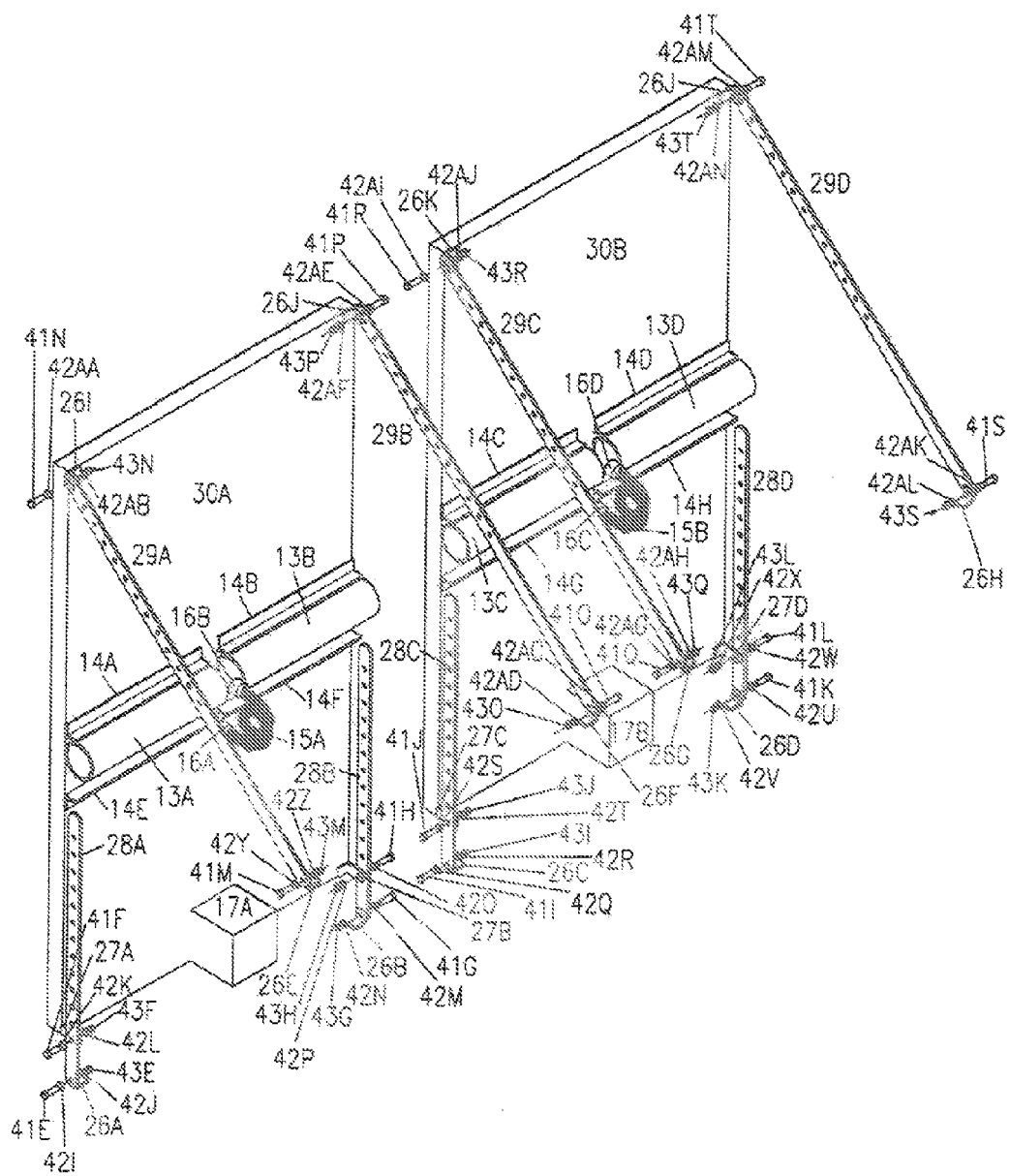
FIG. 9 is a perspective view of the solar panel assembly.

The solar panel mounting bracket, shown in FIG. 9, may provide great stability for the solar panels 44 and may allow the solar panels 44 to be rotated vertically for proper alignment. The solar panels may fit in solar mounting trays 30, which may be pivotally mounted to the walkway structure 133 via, solar mounting pipes 13 and solar mounting angles 14. Power may be transferred through flex hose 15 attached via flex hose connector 16. The solar mounting trays 30 may each include a solar junction box 17. The solar panels 44 may be further supported and locked into place relative to the walkway structure 133 via lower stabilizing bars 28 and upper stabilizing bars 29, each held in place with angle mounting brackets 26 and 27. The various components may be connected via fasteners, such as bolts 41, washers 42, and hex nuts 43.

Figure 10:
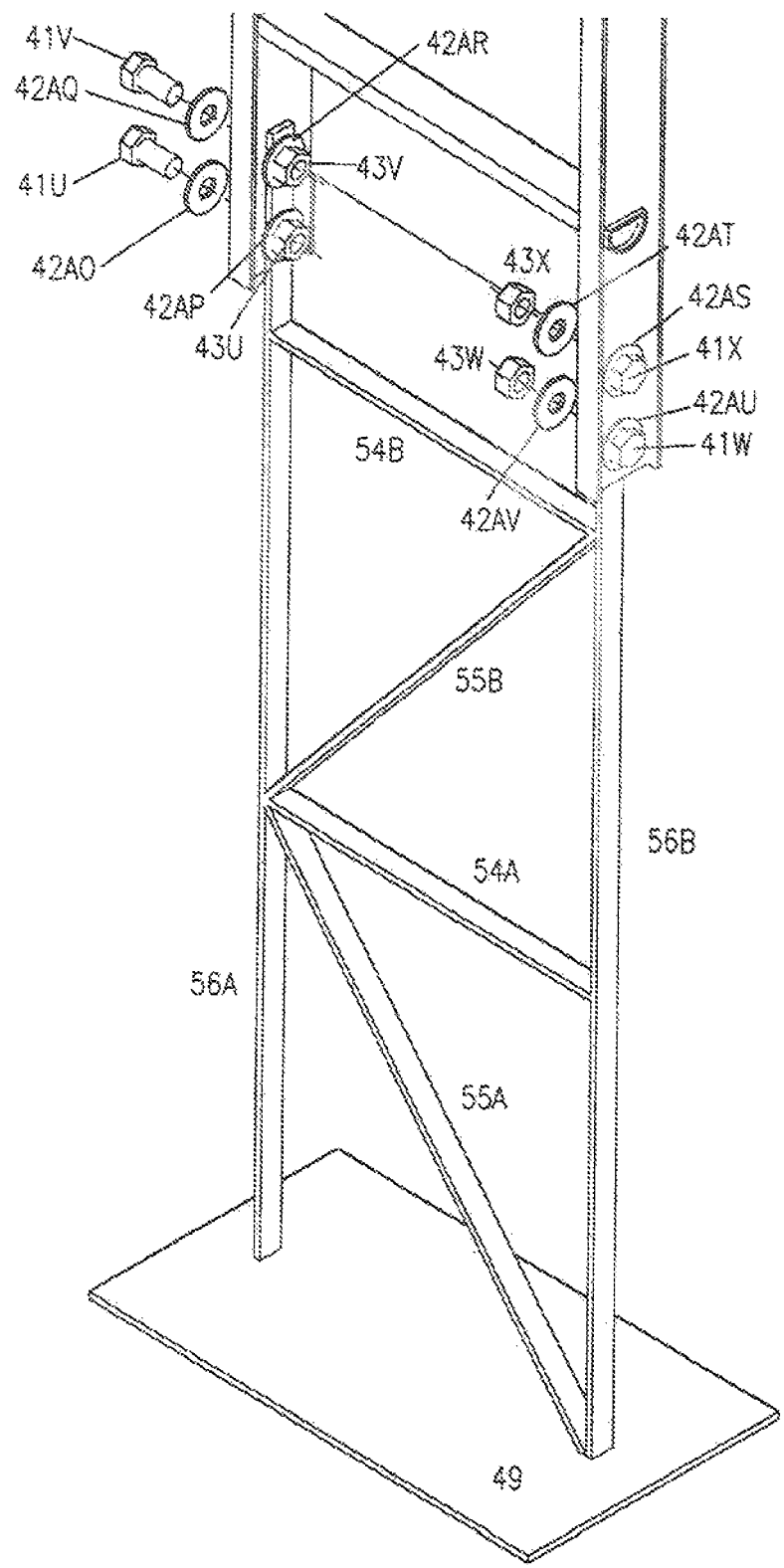
FIG. 10 is a close-tip view of the bottom of the ladder.
Figure 11:
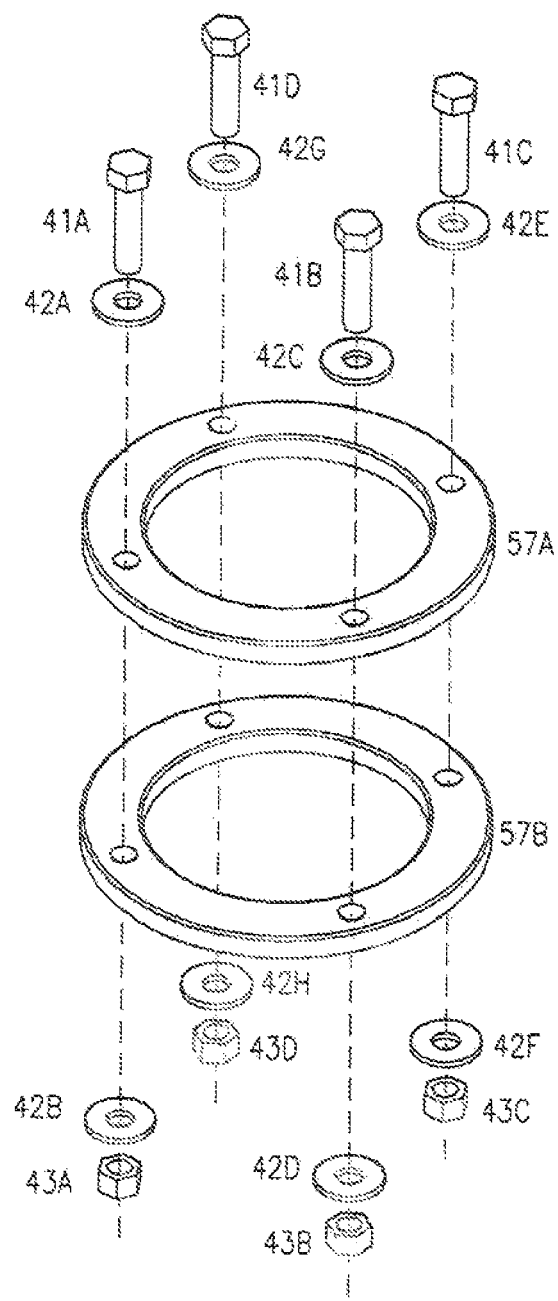
FIG. 11 is an exploded view of the flanges.
Figure 12:
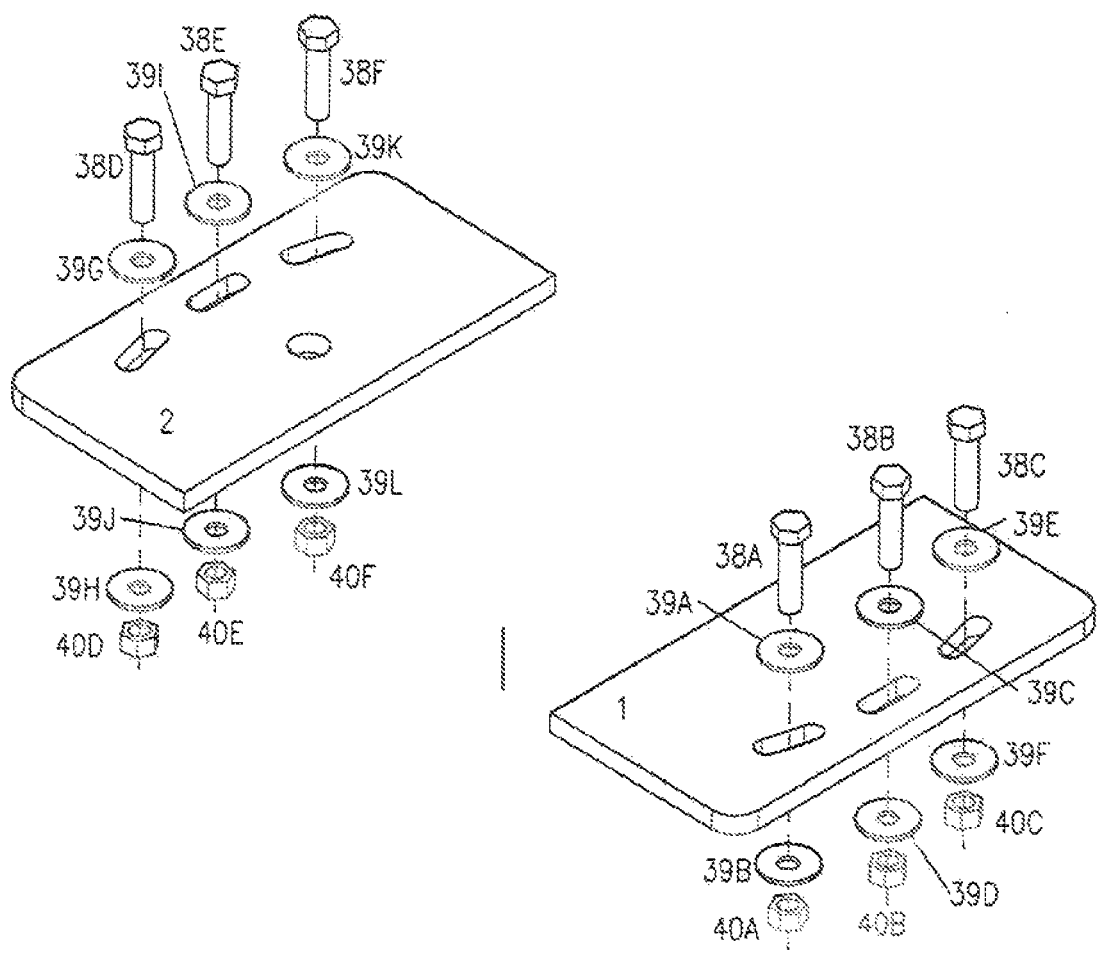
FIG. 12 is an exploded view of the mounting plate of the walkway.

The base of the ladder 51 may have a ladder stabilizing plate 49, as seen in FIG. 10, which may connect to the ladder 51 via ladder stabilizing horizontal bars 54, ladder stabilizing diagonal bars 55, and ladder stabilizing vertical bars 56, as well as hex head bolts 41, washers 42, and hex head nuts 43. FIG. 11 shows how bolts 41, washers 42, and nuts 43 may also hold together flanges 57, while FIG. 12 shows how bolts 38, washers 39, and nuts 40 may be used to secure mounting plates 1 and 2.

Figure 13:
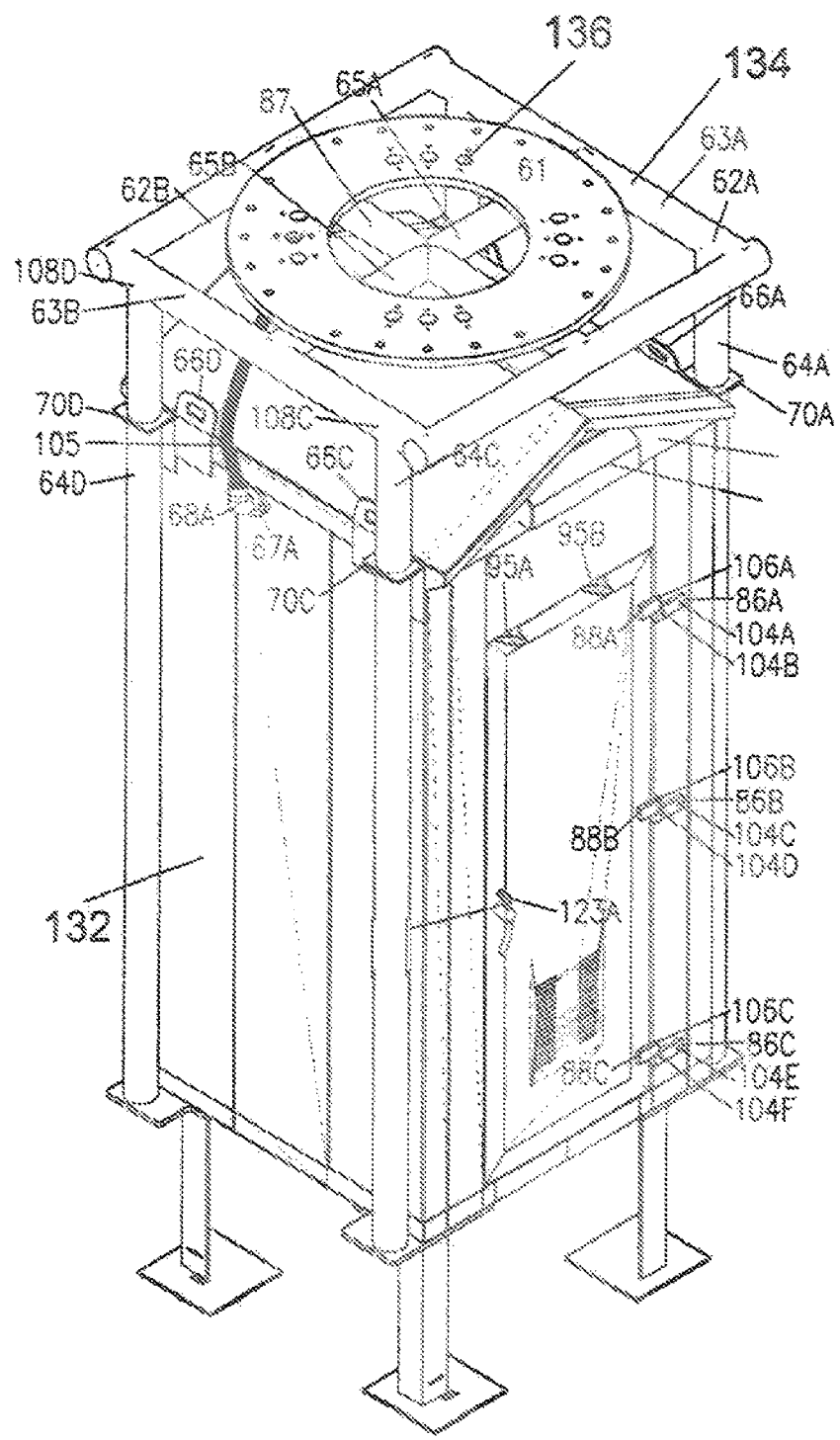
FIG. 13 is a perspective view of the front and one side of the bungalow.
Figure 14:
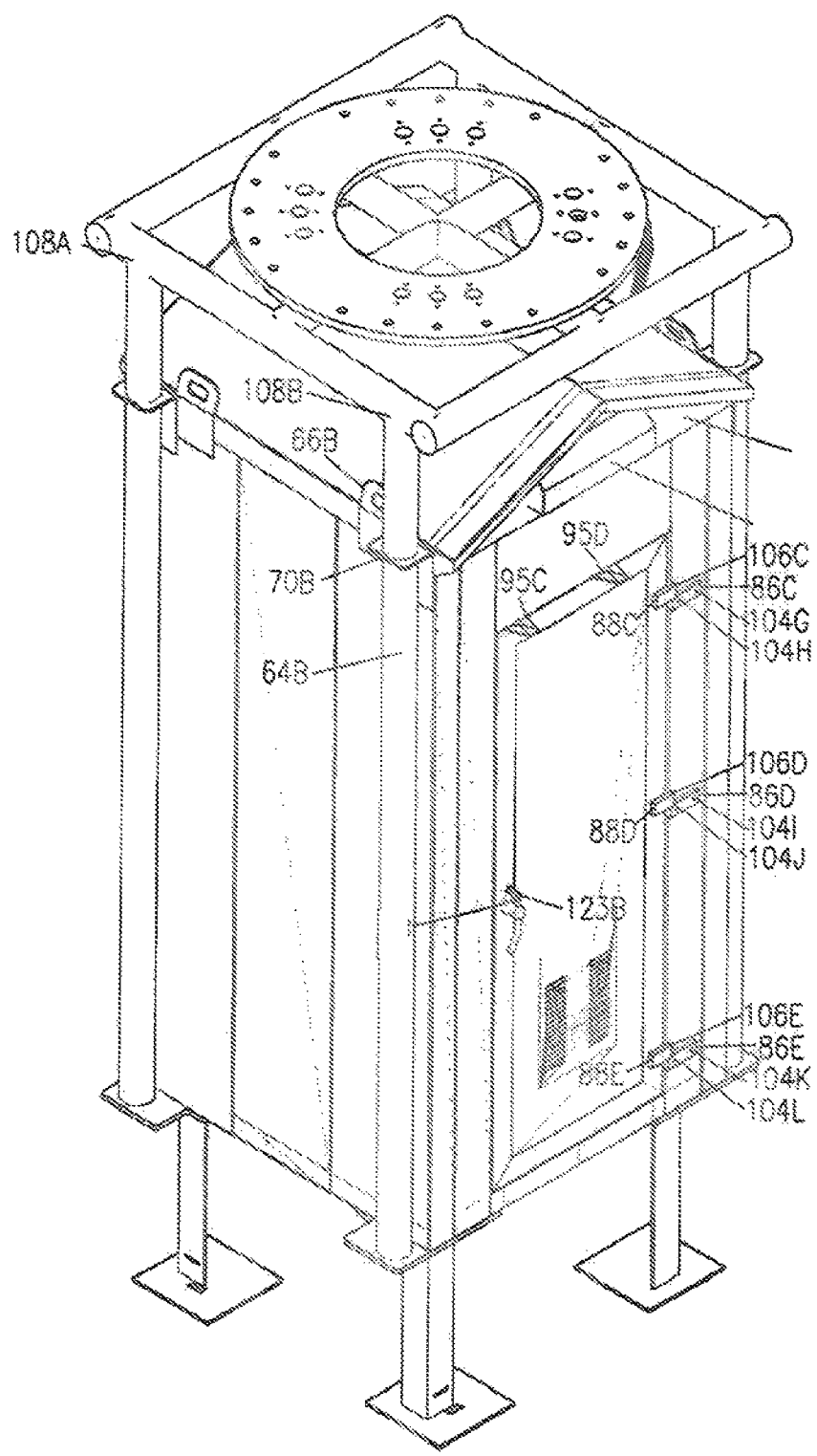
FIG. 14 is a perspective view of the back and other side of the bungalow.

FIGS. 13 and 14 show the bungalow surrounded by an external frame 134. A lower walkway mounting plate 61 may be mounted atop the external frame 134. The walkway structure 133 may attach to the external frame 134 by securing the mounting plates 1 and 2 to the mounting plate 61. The mounting plate 61 may have twelve sets of bolt holes 136, which may allow for the walkway structure 133 to be rotated horizontally into a chosen position where the solar panels 44 will be most efficient. Once the walkway structure 133 is in the desired position, it may be fastened to the mounting plate 61. The robust frame 134 surrounding the bungalow assembly 132 may support the weight of the walkway structure 133 and its attachments. Once secured, the entire unit may be capable of withstanding wind speeds up to 120 mph.

The external frame may be made up of front and back support pipes 62, center support pipes 63, corner vertical support pipes 64, corner support pipes 65, center support pipe 87, and end caps 108, and may be connected to the bungalow assembly 132 via side plates 70. A connector 67 may extend from the bungalow assembly 132 through the external frame via an elbow 68.

The bungalow, shown in various aspects in FIGS. 13, 14, and 16 through 19, may comprise side plates 70, wall panels 71, 72, and 73, corner wall panels 74 and 75, side wall panels 76, top end wall panels 77, and roof sections 78. The bungalow assembly 132 may have lifting lugs 66 to allow for transport of the bungalow assembly 132. The bungalow assembly 132 may have a front door and/or a back door, where each door may be attached to the bungalow assembly 132 via hinges and where each hinge may have a house side of hinge 86 and a door side of hinge 88 held together by hinge pin 106 and bolt 104. Each door may have door handle 98, a door lock plate 123, and door catches 95.

Figure 15:
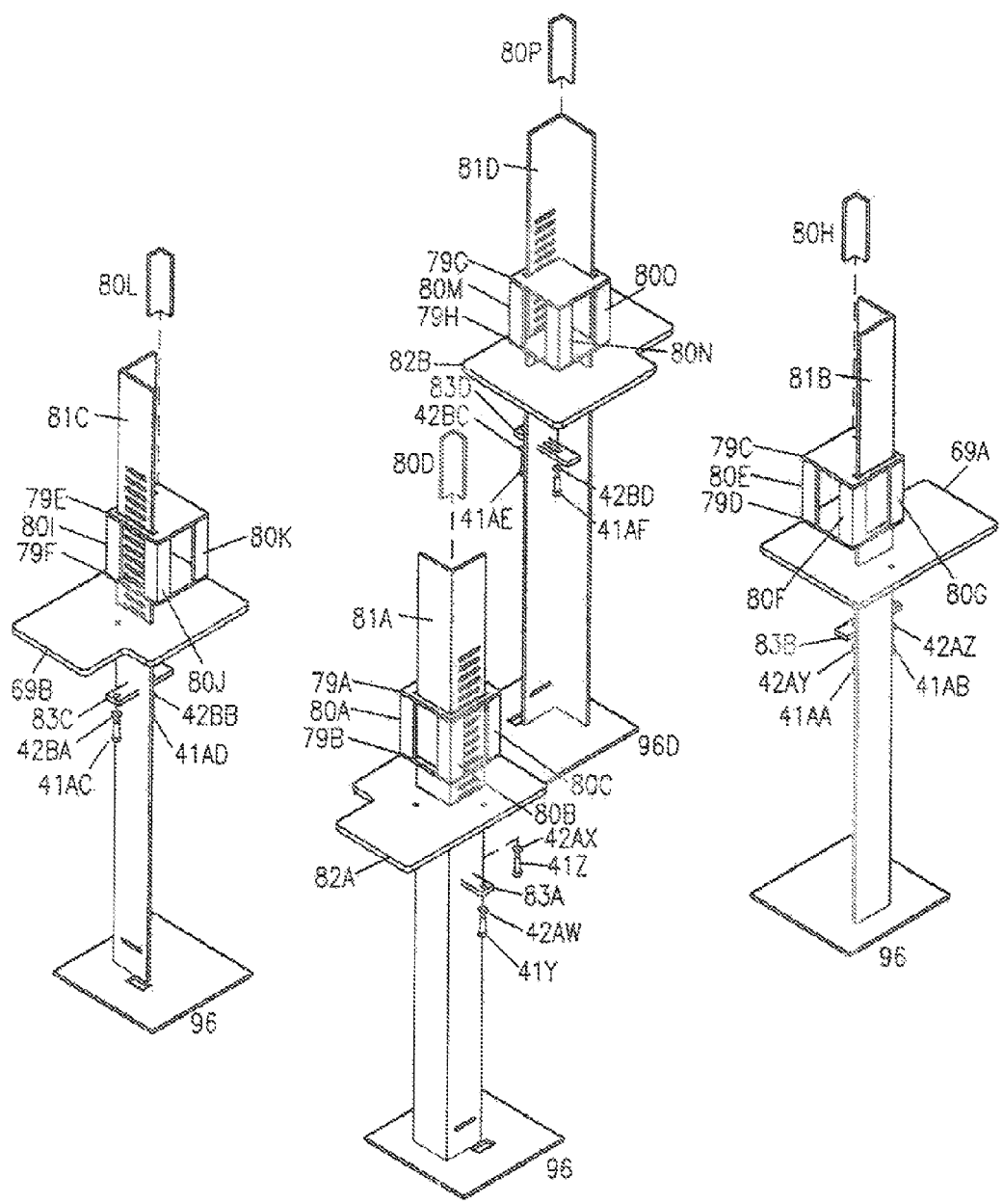
FIG. 15 is an exploded view of the legs of the bungalow.

The bungalow assembly 132 may be supported on the ground via four or more legs 81. As shown in FIG. 15, the legs 81 may each have a corner support plate 69 or 82, plates 79, angles 80, and a stop plate 83. Each of the legs 81 may have a plate 96 under the leg 81. The plates may rest on ground, may be buried in the ground, or rest on a concrete pad.

Figure 16:
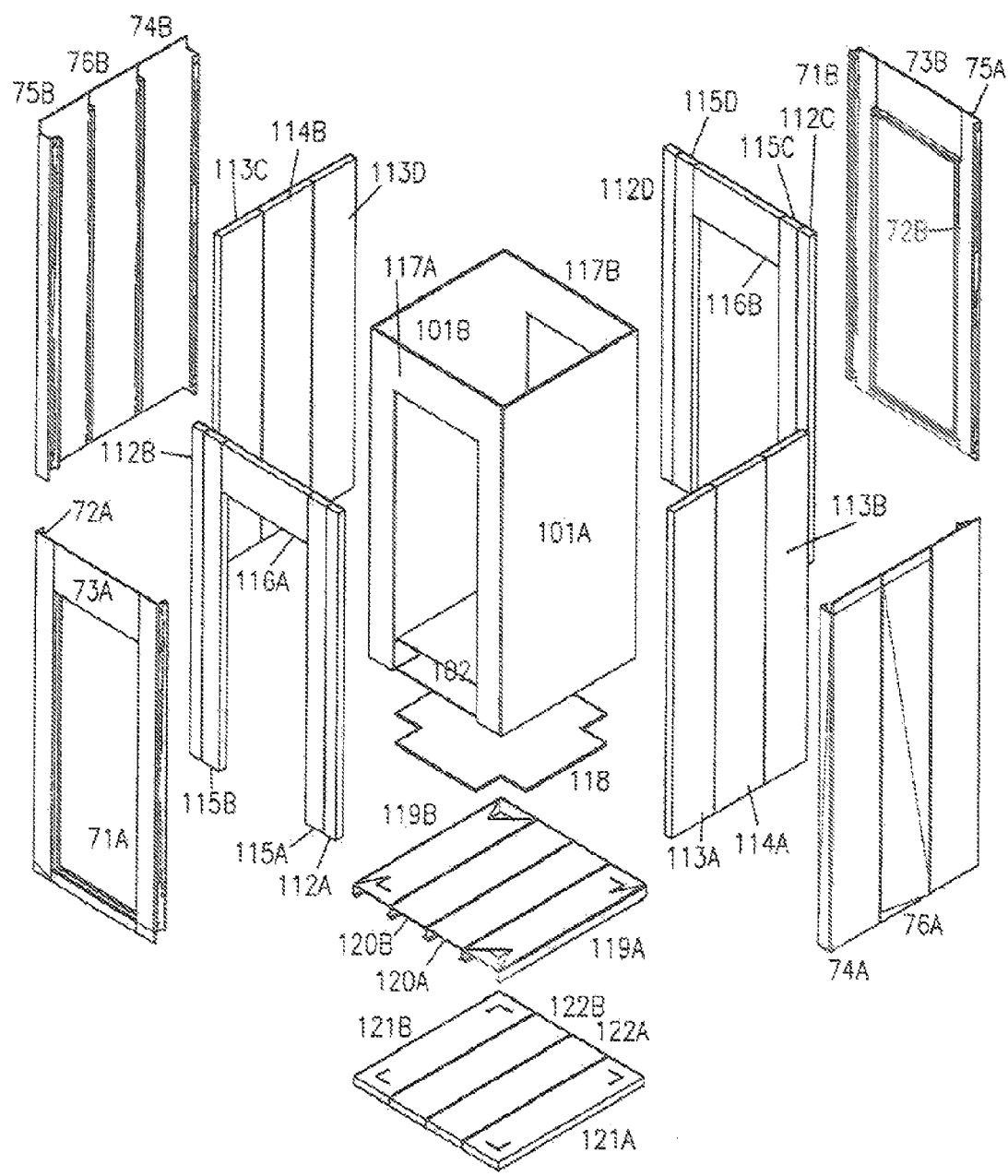
FIG. 16 is an exploded view of the bungalow.

FIG. 16 shows an exploded view of the internal structure of the bungalow assembly 132. In addition to the external components discussed above, the bungalow assembly 132 may have medium density fiberboard walls 101 and 117, a rubber mat 102, wall insulation 112 through 116, medium density fiberboard floor 118, floor panels 119 with holes for the legs 81, floor panels 120, floor insulation 121 with holes for the legs 81, and floor insulation 122.

Figure 17:
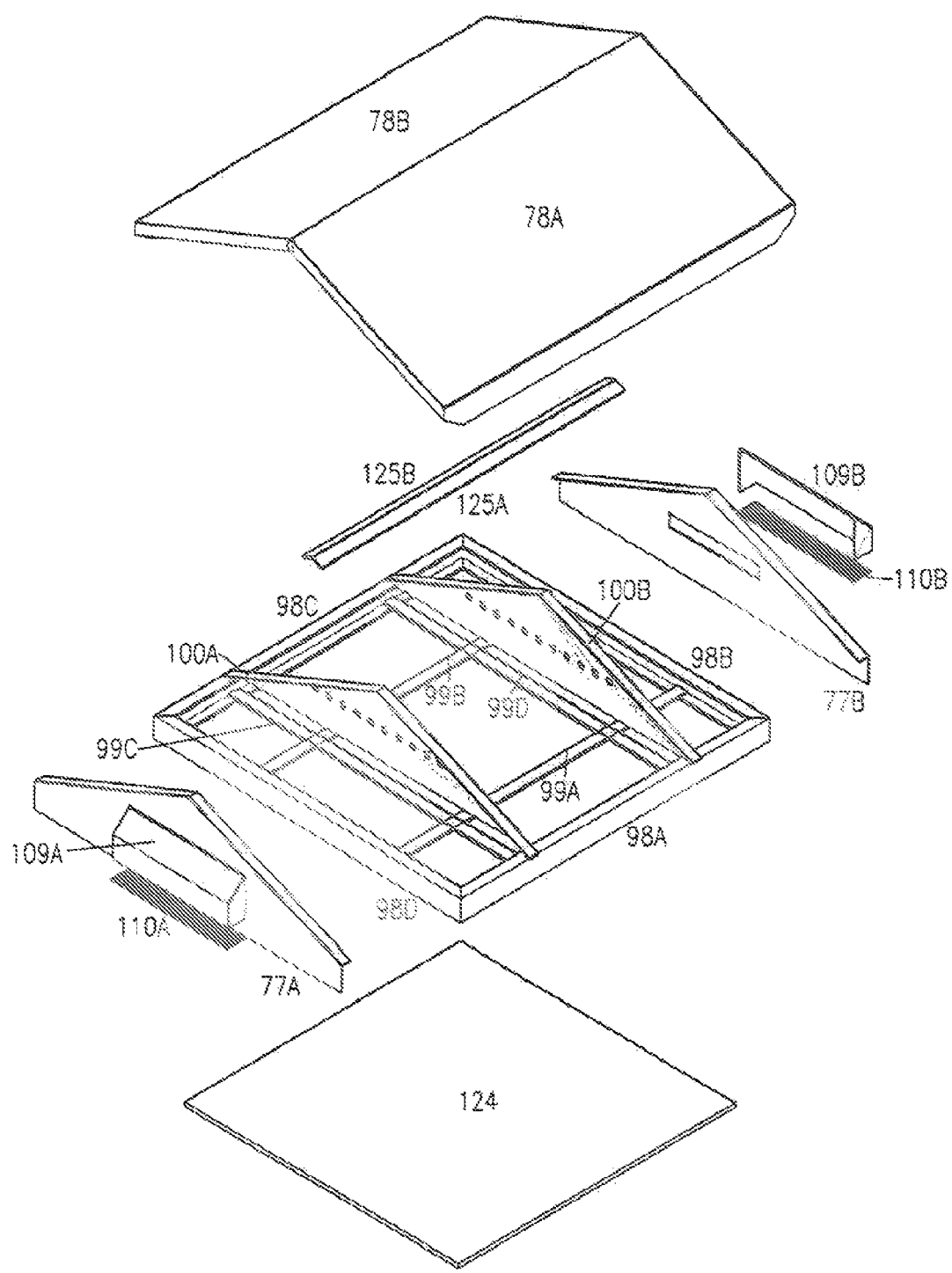
FIG. 17 is an exploded view of the roof.

The roof of the bungalow assembly 132, as shown in FIG. 17, may have the roof sections 78 discussed above, as well as a ceiling 124, which may be made of medium density fiberboard. The roof may further have a structural framework with c-channels 98 above the ceiling 124, ceiling support bars 99, supports 100 above the ceiling 124, and a roof support bar 125. The top end wall panels 77 at the front and back of the bungalow assembly 132 may each have a vent cover 109 with a vent cover insect screen 110.

Figure 18:
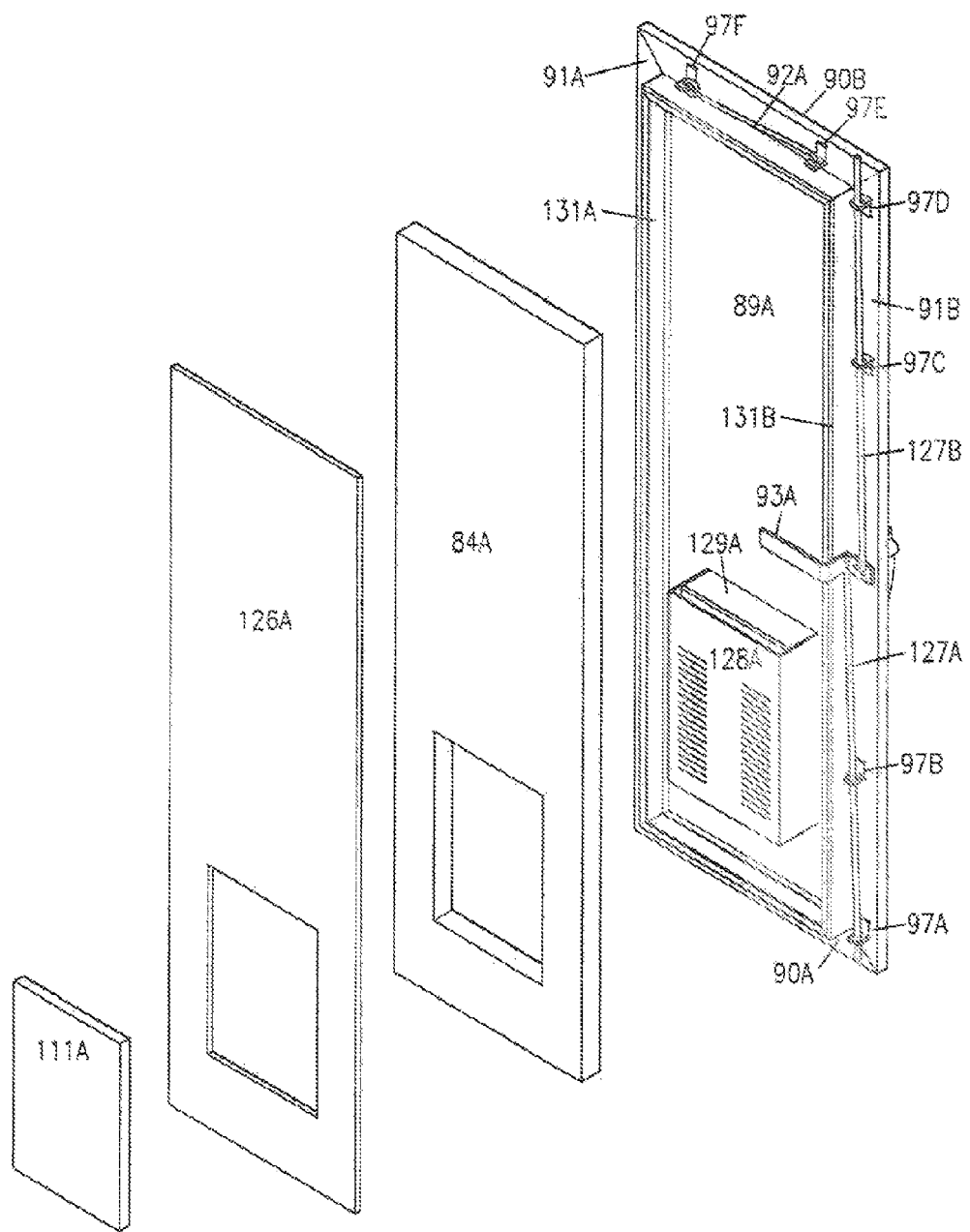
FIG. 18 is an exploded view of the front door.
Figure 19:
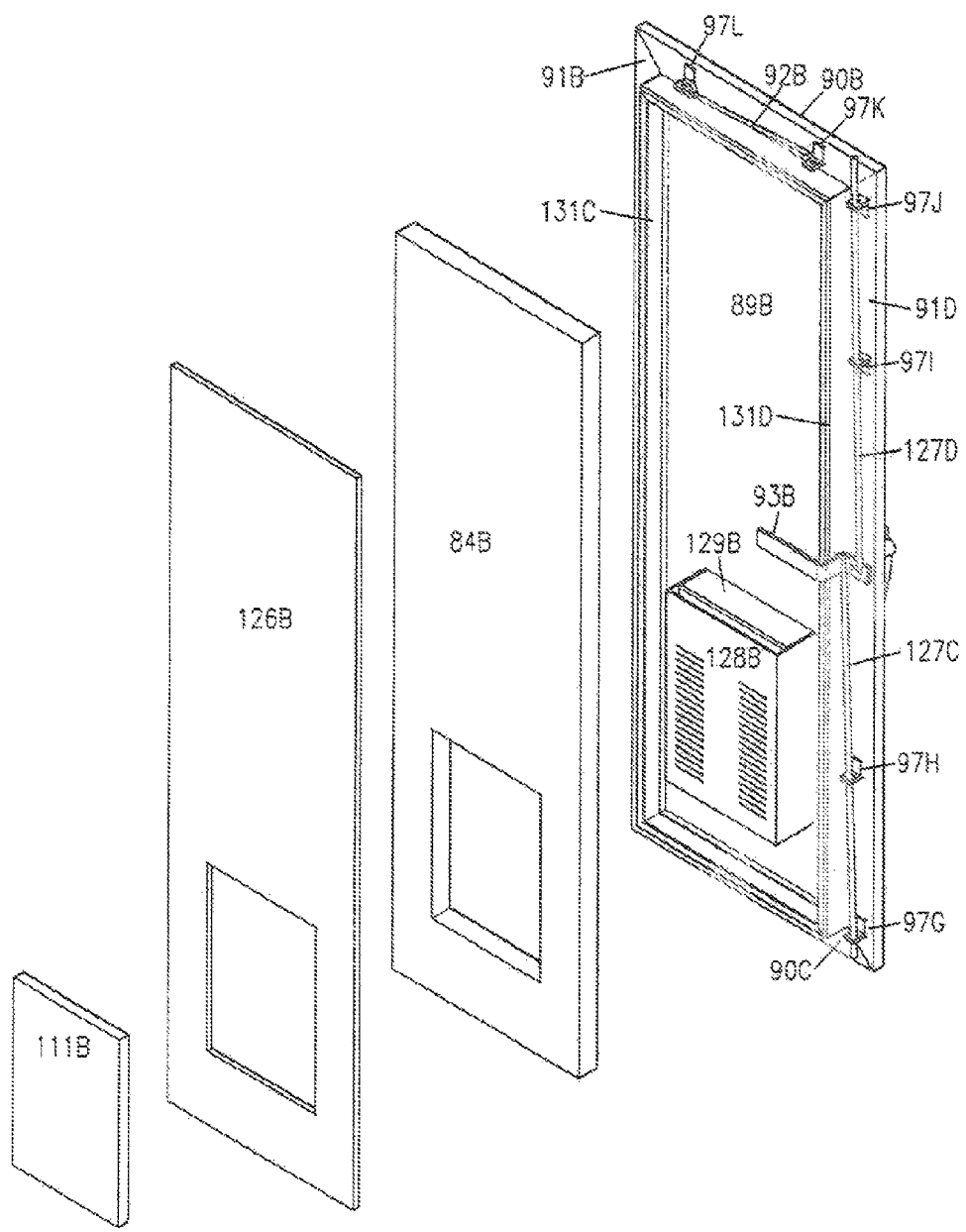
FIG. 19 is an exploded view of the back door.

The front and back doors of the bungalow assembly 132, as shown from an interior perspective in FIGS. 18 and 19 respectively, may each be made up of a door 126, which may be made of medium fiberboard, door insulation 84, and a door panel 89. The door panel 89 may hold a filter holder 128 with a filter stabilizer 129, where the filter holder 128 holds a filter 111. The door panel 89 may have horizontal edges 90 and vertical edges 91, as well as horizontal and vertical door insulation holders 130 and 131, a door prop 92, door rods 127, door angles 97 holding the door prop 92 and door rods 127, and an interior door handle 93.

The bungalow, the external frame and the walkway structure may be assembled in a desired configuration and then shipped to a site for installation.

Whereas, the devices and methods have been described in relation to the drawings and claims, it should be understood that other and further modifications, apart from those shown or suggested herein, may be made within the spirit and scope of this invention.

What is claimed is:

1. A railroad signal bungalow assembly comprising:
   a railroad signal bungalow;
   an external frame;
   a walkway structure assembly;
   one or more solar panels supplying power to equipment in the bungalow; and
   a wind turbine supplying power to equipment in the bungalow.

2. The railroad signal bungalow assembly of claim 1 where the external frame surrounds and is attached to the railroad signal bungalow.

3. The railroad signal bungalow assembly of claim 1 where the walkway structure assembly is mounted to the external frame.

4. The railroad signal bungalow assembly of claim 1 where the walkway structure assembly is mounted to the external frame above the railroad signal bungalow.

5. The railroad signal bungalow assembly of claim 3 where the external frame has a mounting plate with a plurality of bolt holes such that the walkway structure assembly may be mounted to the external frame via the mounting plate in any of a plurality of orientations.

6. The railroad signal bungalow assembly of claim 1 wherein the solar panels are attached to solar panel mounting brackets which are adjustably connected to the walkway structure.

7. The railroad signal bungalow assembly of claim 1 where the solar panels and wind turbine are mounted to the walkway structure assembly.

8. The railroad signal bungalow assembly of claim 7 wherein the wind turbine is mounted above the solar panels.

9. The railroad signal bungalow assembly of claim 7 where the solar panels are mounted to the walkway structure assembly via a solar panel mounting bracket, where the solar panel mounting bracket allows the solar panels to pivot such that the solar panels may be angled as desired.

10. The railroad signal bungalow assembly of claim 1 further comprising a ladder attached to the walkway structure assembly such that the walkway structure may be accessed via the ladder.

11. The railroad signal bungalow assembly of claim 1 further comprising guy wires attached to the walkway structure assembly such that the guy wires may extend to and be secured into ground.

12. A railroad signal bungalow assembly comprising:
    a railroad signal bungalow;
    an external frame surrounding and attached to the railroad signal bungalow;
    a walkway structure assembly mounted to the external frame above the railroad signal bungalow;
    a plurality of solar panels mounted to the walkway structure assembly supplying power to equipment in the bungalow; and
    a wind turbine mounted to the walkway structure assembly supplying power to equipment in the bungalow.

\* \* \* \* \*